United States Patent Office 3,422,448
Patented Jan. 14, 1969

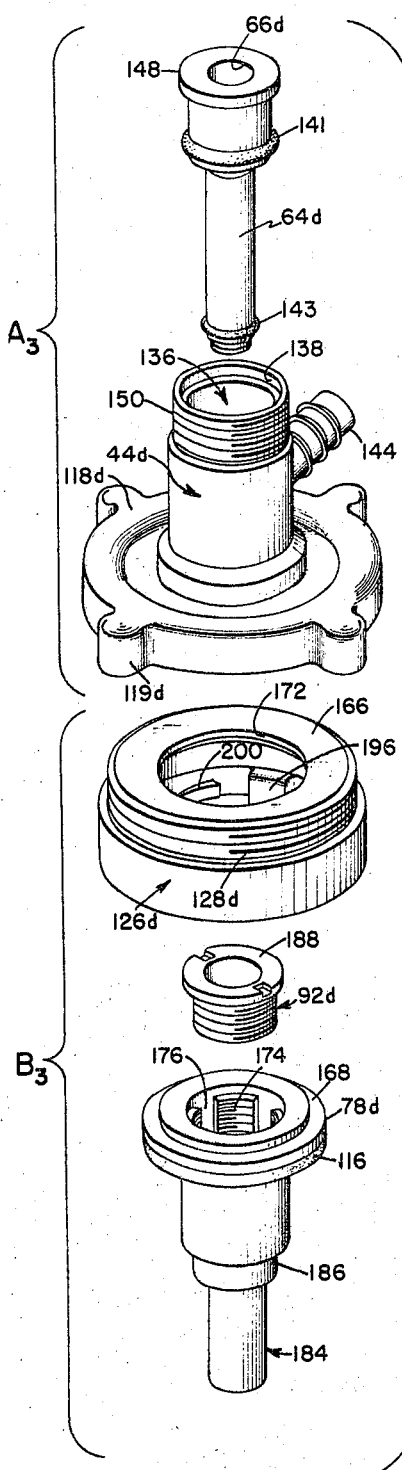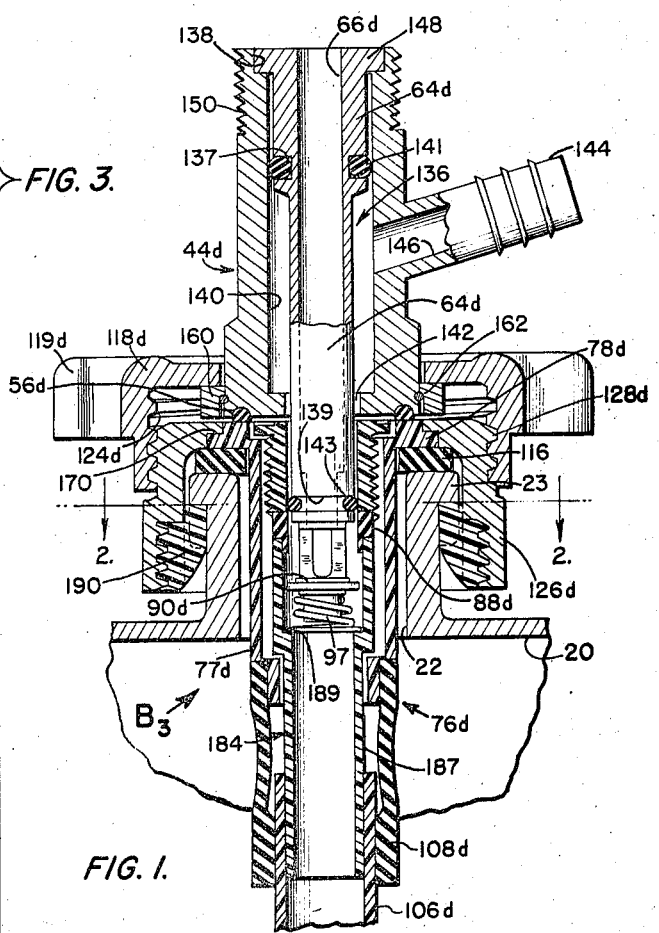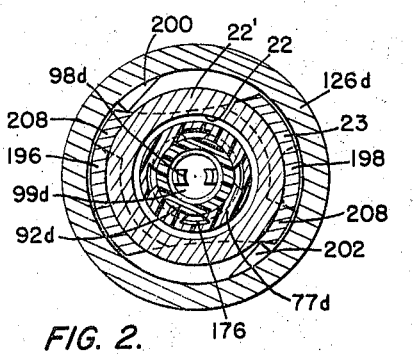

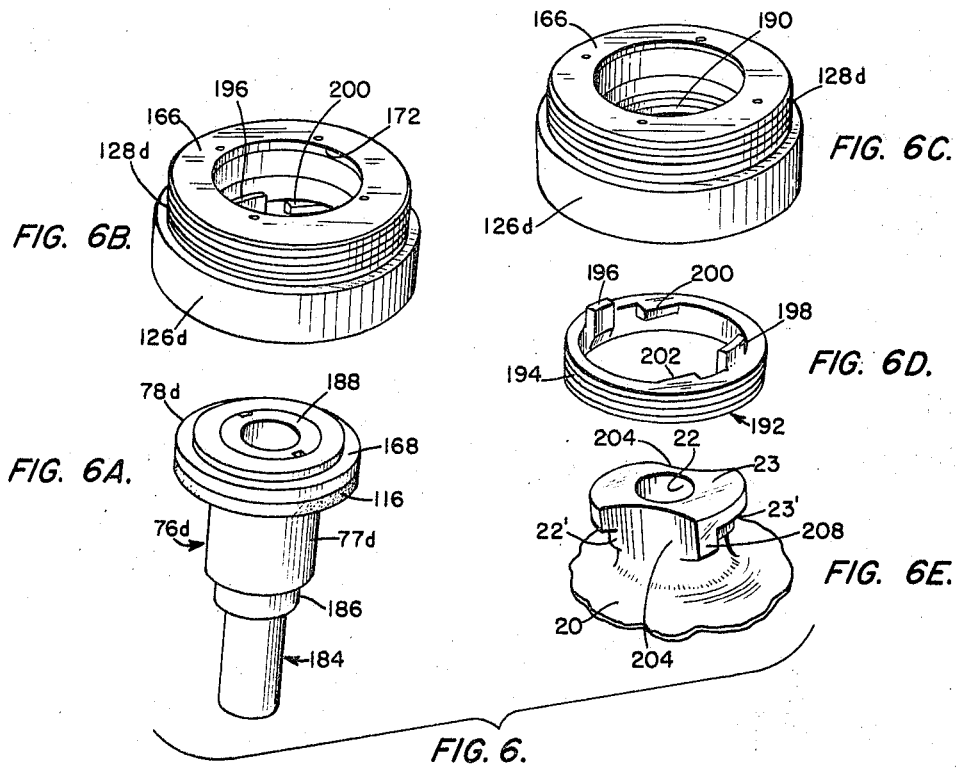
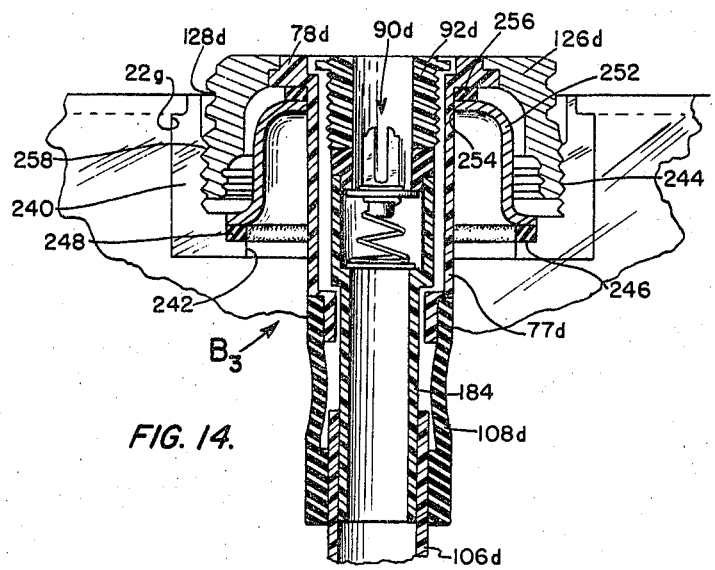

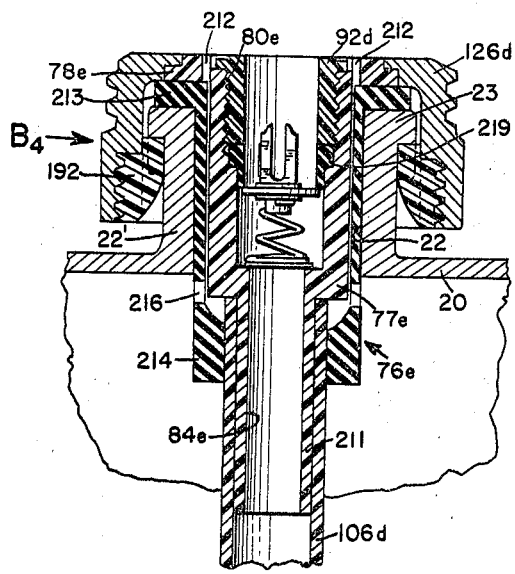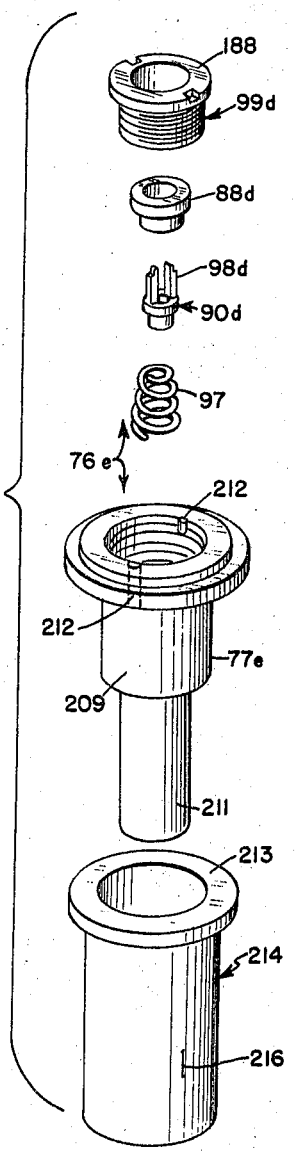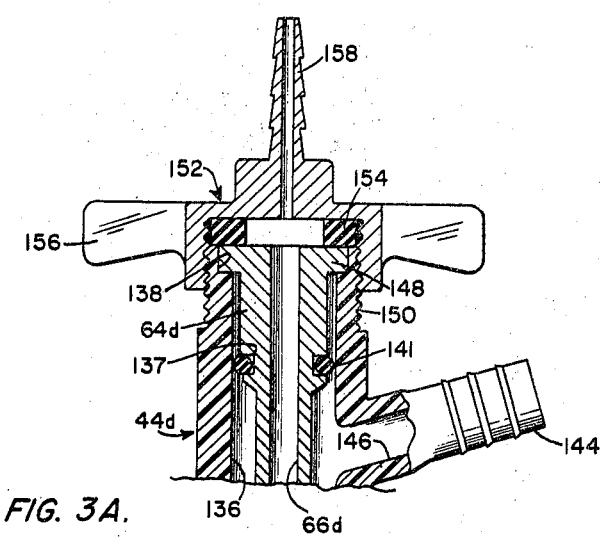

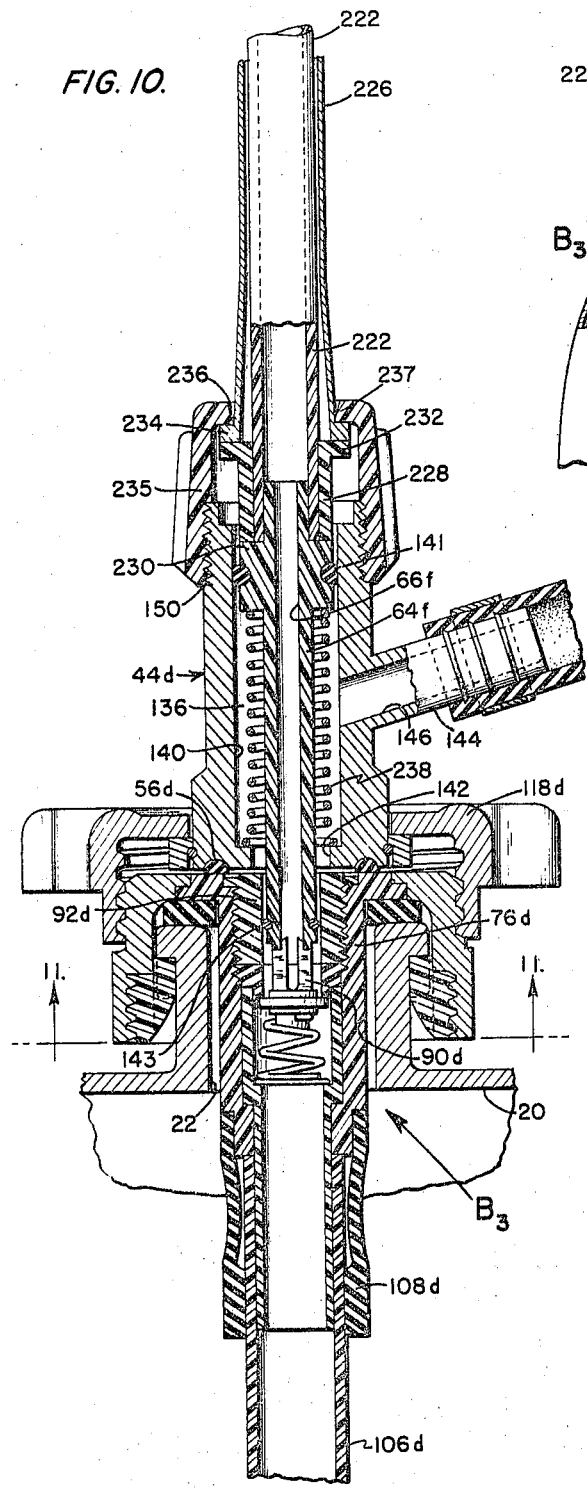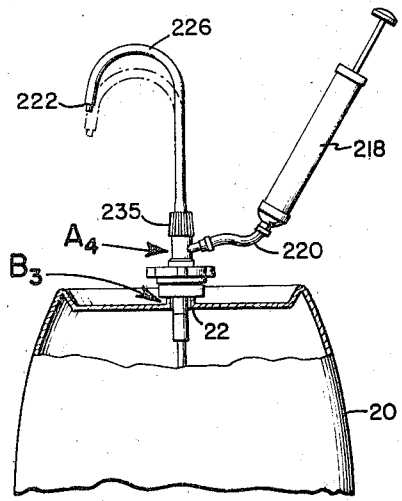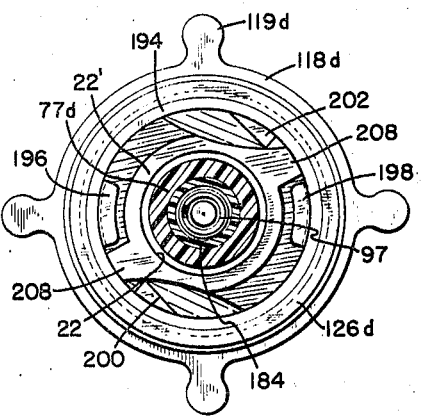

3,422,448
TAPPING DEVICE FOR BEER KEGS AND THE LIKE
Mack S. Johnston, Kalispell, Mont., assignor to Johnston Enterprises, Inc., East Kalispell, Mont., a corporation of Montana
Continuation of application Ser. No. 406,682, Oct. 27, 1964. This application Oct. 18, 1966, Ser. No. 587,627
U.S. Cl. 222—400.7       20 Claims
Int. Cl. B65d 83/14; B67d 1/14; B67d 5/54

ABSTRACT OF THE DISCLOSURE

Disclosed is a novel tapping device for beer kegs and the like including a keg adapter mounted in the keg at the brewery and a probe type coupler attached at the restaurant or tavern to the keg. The adapter has separate enlarged beer and gas passages through it as does the coupler. In the adapter, a large arcuate gas passageway communicates with a resilient gas check valve on the adapter. A modified coupler for use at picnics has a probe which may be manually depressed to tap the keg.

---

This application Ser. No. 587,627 is a continuation of my copending application Ser. No. 406,682, filed Oct. 27, 1964, for Siphon Device for Beer Kegs and the like, now abandoned; said application Ser. No. 406,682 is a continuation-in-part of my copending application Ser. No. 150,982 filed Nov. 8, 1961, entitled "Siphon Device for Beer Kegs and the like," and also of my likewise entitled copending application Ser. No. 395,084, filed Sept. 8, 1964 as a continuation of my aforesaid application Ser. No. 150,982. Said application Ser. No. 150,982 was abandoned (after Notice of Allowance), in favor of said copending application Ser. No. 395,084, which issued as U.S. Patent No. 3,231,154 on Jan. 25, 1966. Said application Ser. No. 150,982 filed Nov. 8, 1961 was itself a continuation-in-part of my then co-pending application Ser. No. 25,592 entitled "Beer Siphon Assembly," filed Apr. 29, 1960, which was abandoned in favor of my application Ser. No. 159,818 entitled "Beer Siphon Assembly" filed Dec. 8, 1961 as a continuation of and copending with said application Ser. No. 25,592; said application Ser. No. 159,818 was issued as U.S. Letters Patent No. 3,156,252 on Nov. 10, 1964.

The present invention relates to a new improved tapping device for drawing fluid such as beer from containers such as beer kegs or barrels, using a gas to drive the fluid from the container. In particular, the invention relates to a new improved tapping device usable with conventional beer kegs and comprising a sub-unit, called a "keg adapter," which constantly seals the keg, and a sub-unit, called a "coupler," which is attached to the beer dispensing apparatus in a restaurant or tavern and is readily connected to the keg adapter so that the tapping device is automatically in operating condition.

Today as in the past, the most widely prevailing practice in the beer industry is for a brewery to provide draft beer to retail outlets in "conventional" kegs which have a ¾ inch opening in the top, closed with a bung in the form of a cork or plug. To dispense the beer from the keg, the bartender "taps" the keg by knocking in or pushing in the bung and inserting an elongated tap rod with an associated "siphon" device for drawing the beer from the keg, these being fastened to the keg by means of a "bayonet" or like connection. This siphon device includes means for injecting compressed air or $CO_2$ through the tap rod into the keg to drive the beer up through the siphon, and also external valve means for respectively controlling the flow of gas into the keg and beer from the keg. A gas supply hose connects the siphon to a source of gas, and another hose connects it to the beer dispensing apparatus mounted on the counter or bar in the restaurant or tavern whereby beer may be dispensed from the keg. When the beer has been withdrawn from the keg to the extent feasible, the bartender then removes the tap and siphon device from the keg, removes the keg from the dispenser cabinet, installs a new keg, and repeats the process of knocking in or pushing in the bung and installing the tap rod and related siphon equipment, etc. The same tap rod and siphon is used for every keg, and must be washed and cleaned periodically to prevent fouling and contamination.

This prevailing practice, which has been used for fifty years, has a number of disadvantages for the brewery, the dispensing establishment, and the public: The open empty kegs often become filled with debris and trash of every sort. Not infrequently mice or other objectionable things get into the keg and swell and become difficult to remove through the bung hole. Insects which get into the keg and dry on the inside wall are very difficult to wash off. Also, old yeast and other solids from the beer inevitably accumulate within the currently used conventional tap and siphon arrangements, with resultant accumulation of destructive bacteria feeding on this material. When a new keg is tapped and the gas pressure is applied, the fresh beer surges into unclean portions of the tap and siphon devices and this causes the accumulated residue of yeast, bacteria, etc., to be washed down into the keg, thus promptly contaminating the carefully brewed product and also destroying its "brewery-fresh" flavor. This problem is further aggravated by the fact that in dispensing the beer from the keg there is a tendency of the beer to surge back and forth into the tap chamber where the old yeast and destructive bacteria have accumulated as varying gas pressure is applied when the dispensing apparatus is operated. Hence, when a keg is tapped with conventional methods, the great care in preparing pure good quality beer at the brewery promptly goes to naught at the dispensing establishment.

Further, on tapping, a substantial quantity of beer usually surges from the keg, with economic loss and a resulting mess. Then, when the bartender removes the tap rod and siphon arrangement from an empty keg, residual gas pressure in the keg will often cause the tap and siphon unit to pop out suddenly, sometimes injuring the bartender. Moreover, the beer keg is generally kept in a refrigerated unit under the bar, with limited space, as a result of which conventional tapping of the keg by the bartender is somewhat awkward, time-consuming and difficult (especially if the bartender is not too strong).

In an attempt to eliminate some of these aforementioned problems, an alternative tapping device was adopted by one of the largest breweries. However, the alternative tapping device utilizes a non-conventional keg having an opening in the top with a fitting therein for receiving gas, plus another opening in the side of the keg near the bottom with a fitting therein for dispensing the beer. This arrangement requires manufacture, installation and coupling of two fittings. Also, the barrel is usually tilted to dispense the beer to maximum extent, which makes handling more difficult and requires more space. Further, the non-conventional keg and its two fittings are not only more expensive, but also introduce problems in high speed automatic cleaning and filling of kegs if the brewery is committed to above-described conventional kegs as is usually the case. Hence, the above-described tapping arrangement is still in common use, notwithstanding its many shortcomings.

However, it should be noted that the fact that these two aforementioned tapping devices are the only ones which have had substantial commercial usage prior to this invention does not mean that others have not attempted to design and develop tapping devices that would obviate the above-mentioned problems without creating others. Numerous beer tapping devices have been proposed over the last 50–60 years. However, because of various practical shortcomings, these numerous proposed devices have not gained substantial acceptance in the draft beer industry. Perhaps, the principal reason why these other devices did not replace the present commercial tapping devices is because the designers of these devices did not take into account several important "facts of life" in handling draft beer.

Beer, unlike many other liquids, must be handled with extreme care lest it lose those qualities, such as taste, proper head and foam, and freedom from cloudiness, which the public demands. Thus, if the flow path from the keg to the dispensing apparatus is too tortuous or contorted or if there is too large a pressure drop across the tapping device caused by a restricted flow path, the beer will become "flat" or "wild" (e.g., too much foam).

Also, most (millions) beer kegs or barrels in use in the United States at the present time have a ¾ inch beer dispensing opening in their top and are designed to have the tapping unit connected to the keg by means of a bayonet-type coupling. Therefore, to gain acceptance in the industry a new draft beer tapping device must be adapted for use with this small opening, and with the aforesaid means of attachment to the kegs. However, the problem is not merely one of miniaturization; e.g., if substantial industry penetration is to be expected, an improved tapping device must be "universal" for use with both high and low pressure draft beer dispensing systems that are used in different parts of the United States, without adversely affecting the quality of the beer.

Still further, an improved draft beer tapping device must be rugged so as to withstand rough treatment and handling, not only during the travel to and from the breweries, but also at the dispensing establishment. In this regard, the device must not only be constructed of strong, durable non-toxic materials, but it must also be designed so that it will not project from the top of the keg, because it will commonly be knocked off the keg during handling.

However, even if an improved tapping device meets these above criteria and obviates the above-described problems, it must be subject to economical manufacture for sale at a competitive price in order to be successful.

My aforementioned United States Patent No. 3,231,154 issued from my above-identified parent application Ser. No. 395,084 which discloses a new improved beer tapping device for dispensing beer or like liquids in kegs or barrels which overcomes the above-discussed and other problems and shortcomings of beer dispensing systems heretofore available, and also provides a number of important advantages and improved results as hereinafter amplified. Particularly, the invention of my aforesaid Patent No. 3,231,154 provides a new, improved means for packaging and dispensing beer and like liquids in kegs, utilizing an adapter subassembly installed in and sealing the keg at the brewery, with a new improved coupler sub-assembly which is fastened to said keg adapter by the tavern keeper or bartender, thus automatically breaking the seal and readying the keg for the dispensing of beer. Simple removal of the aforementioned coupler sub-assembly by the bartender causes the keg to automatically re-seal, thereby positively preventing the entry of trash or other foreign objects. In addition, the beer is positively prevented from entering the gas passageway portion of the tapping device, thus preventing contamination or fouling of this portion of the device, by dried beer residue normally accumulating due to surging of the beer.

It is an object of the invention of this application to provide further novel improved beer tapping devices, and novel improved keg adapter and coupler sub-assemblies, and components for the same, of the general type disclosed and claimed in my aforesaid Patent No. 3,231,154, so as to provide additional improvements in construction, mode of operation and result, as below-amplified.

It is one object of the present invention to provide a keg adapter having a compact and efficient gas check valve positioned within the beer keg and surrounding a lower tap rod extending from the keg adapter unit, with the upper end of the gas check valve communicating with improved enlarged gas passageways uniquely formed in the keg adapter unit by omiting portion(s) of the threads of internal keg adapter components, thereby providing both an enlarged beer passage and a gas passage adequate for flow of beer therethrough in a "series" beer keg installation, without structurally weakening the keg adapter unit or enlarging the unit beyond the commercially acceptable size limitation imposed by the ¾ inch standard keg opening for both low and high pressure draft beer systems.

It is still another object of the present invention to provide a new improved beer keg tapping device incorporating a keg adapter which includes an improved bifurcated valve in the liquid passageway of the adapter for controlling the flow of beer from the keg to permit withdrawal of beer in both high and low pressure systems, without undue pressure loss or the beer becoming "wild," and also preventing leakage caused by specks of dirt or the like.

It is a further object of the present invention to provide a new tapping device for dispensing liquids which includes a novel and simplified dispenser coupler unit of three-piece construction and having collar means rotating independently of the coupler unit for easy attachment of the coupler unit to a beer keg without special fittings. Moreover, if this improved coupler unit, the necessity of forming separate gas and liquid passageways in the unit is eliminated by novel cooperation between the probe and the main bore formed in the unit, whereby the bore is able to accommodate both the gas and liquid passageways while still keeping these passageways segregated.

It is still a further object of the present invention to provide a new improved beer tapping device which can be used with any standard type of beer keg in common usage, even though the kegs typically vary considerably in configuration and size, according to source and time produced. Further, the keg adapter unit of this invention, which as mentioned above is semi-permanently fastened in a beer keg, does not protrude from the end of the keg thus avoiding damage by rough handling during transit to and from breweries.

A further related object of this invention is to provide a novel and improved means for securing the aforementioned keg adapter in a conventional beer keg by cooperating with the existing keg neck structure to secure firmly the keg adapter in the beer dispensing opening of such kegs, and prevents any rotational or longitudinal movement of the keg adapter once it is in place. This novel two-piece keg adapter securing means eliminates reliance on friction fits and protects against leakage between the keg adapter and the keg; and, in addition, it can be easily installed on the kegs and, when once installed, is substantially tamper-proof. Moreover, the relatively complex portion of the securing means is completely surrounded and protected by the outer portion of the securing means, thus permitting the protected portion to be molded out of plastic if desired, thereby permitting the securing means to be made inexpensively without sacrificing ruggedness.

It is still another object of the present invention to provide such a new improved means for packaging and dispensing beer or the like from a keg or like container which achieves the above discussed objects and advantages, yet can be made at a relatively low price with conventional machinery and with a minimum of tooling, whereby widespread use of the invention in its intended field is economically feasible.

It is another related object of this invention to provide a modified keg adapter unit including a modified resilient gas check valve positioned at the inner end of a modified gas passageway in the keg adapter unit, with the upper end of the check valve also forming the seal between the beer keg and the keg adapter unit.

It is further related object of this invention to provide a modified system including a dispenser coupler unit which can be utilized at picnics, outings and other places where there is no readily available dispensing apparatus or source of gas under pressure without the problems and mess heretofore associated with the prior picnic dispensers. In this novel unit, controlled dispensing of beer directly from a beer keg is obtained by simply depressing the curved outlet tube mounted on the top of a coupler unit.

Still other objects and advantages of the present invention will be apparent from the following description thereof with reference to the accompanying drawings, and also the appended claims. In the drawings:

FIGURE 1 is a vertical sectional view showing a new improved packaging and dispensing tapping device according to this invention, which is generally similar to the embodiment of FIGURES 5 and 7 of my aforementioned Patent No. 3,231,154, but which includes a modified improved keg adapter unit (shown in particular detail in FIGURES 3–5), plus a modified improved dispenser coupler for use in restaurants or the like (shown in FIGURES 3 and 3A);

FIGURE 2 is a horizontal cross-sectional view taken along line 2—2 in FIGURE 1;

FIGURE 3 is an exploded perspective view showing principal components of the packaging and dispensing device of FIGURES 1 and 2, it being noted that the portion of FIGURE 3 within bracket A constitutes the improved coupler unit applied by the bartender, and that the portion within bracket B constitutes the improved keg adapter unit installed in the keg at the brewery (certain components of the keg adapter unit being unexploded but shown in FIGURE 4);

FIGURE 3A is a vertical sectional view of the upper portion of the improved dispenser coupler unit shown in FIGURE 1 with a conventional dispenser cap secured thereto;

FIGURE 6 is an exploded perspective view comprising sub-figures 6A, 6B, 6C, 6D and 6E showing the new improved arrangement of the present invention for securing the keg adapter to a conventional collar of a beer keg;

FIGURE 7 is a vertical sectional view of another improved embodiment of a beer keg adapter tapping device according to the present invention somewhat modified from the embodiment shown in FIGURES 1–6;

FIGURE 8 is an exploded perspective view showing components of the beer keg adapter tapping device shown in FIGURE 7;

FIGURE 9 is a schematic view showing the new packaging and dispensing beer keg tapping device for use at picnics, outings and the like, incorporating features of the present invention and illustrated as it would be installed in a conventional beer keg;

FIGURE 10 is a vertical sectional view showing in assembled relation the improved picnic packaging and dispensing tapping device for beer kegs illustrated in FIGURE 9 (the units shown in the position they assume when not being operated to dispense beer and the adapter section being along line 10—10 in FIGURE 5A);

FIGURE 11 is a horizontal sectional view taken along line 11—11 in FIGURE 10;

Figure 12:
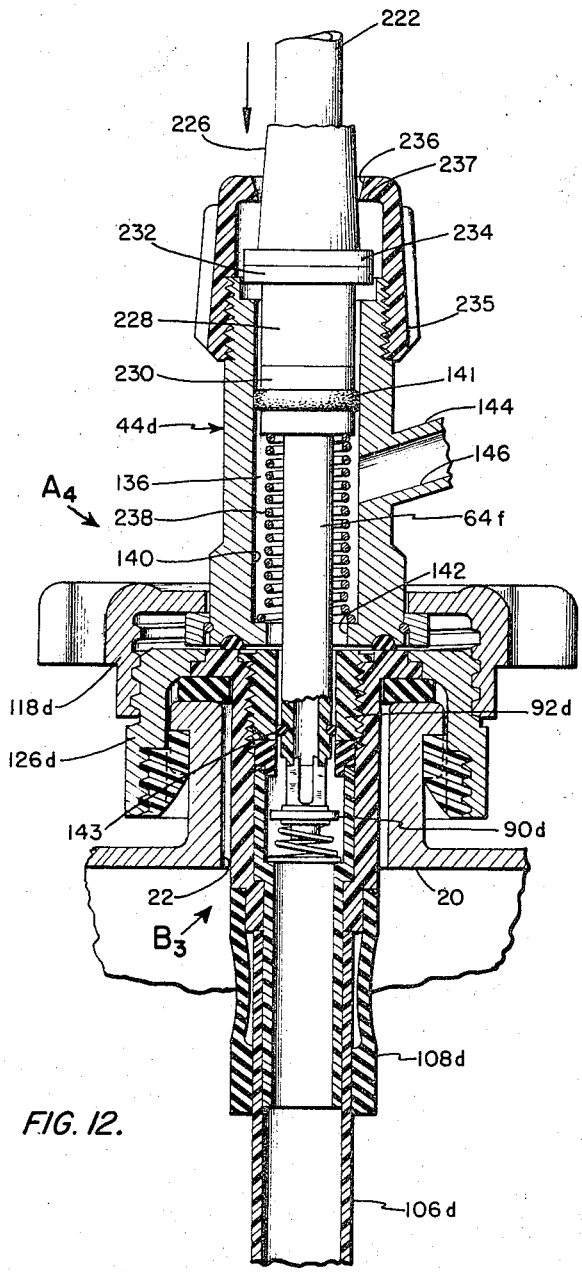
FIGURE 12 is a vertical sectional view like that of FIGURE 10 but showing this improved picnic pump dispensing coupler and keg adapter unit shown in operating position for dispensing beer from the keg.
Figure 13:
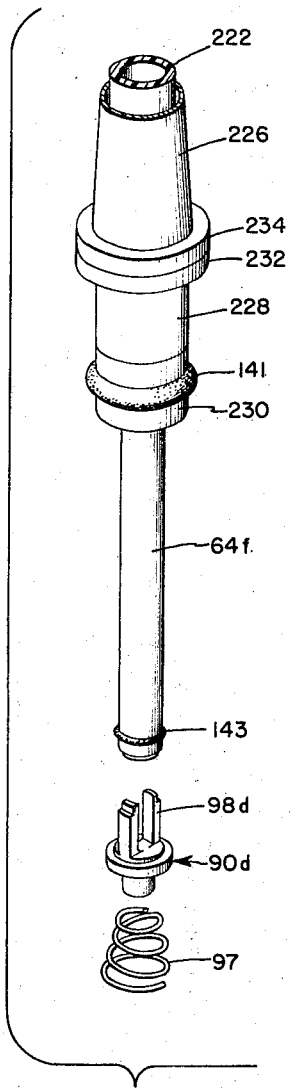

FIGURE 13 is an exploded perspective view showing the probe of the improved picnic dispenser coupler unit of FIGURES 10 and 12 with a portion of the spring loaded beer valve of the keg adapter unit shown in FIGURES 10 and 12; and FIGURE 14 is a vertical sectional view of another modified embodiment of the present invention for readily and economically adapting the keg adapter and coupler dispenser tapping device of the present invention for use with the so-called "Golden Gate" type keg used by part of the U.S. draft beer industry.

FIGURES 1–5B, 6, 7–8, 9–13 and 14 show various embodiments of the present invention constituting improvements on the beer tapping devices and components thereof disclosed and claimed in my aforementioned U.S. Patent No. 3,231,154. FIGURES 1–5B and 6 show a new improved keg tapping and dispensing device $A_3$–$B_3$ including an improved simplified dispenser coupler unit $A_3$ for use with the conventional dispensing apparatus and tanks of compressed gas that are usually found in taverns and restaurants (per FIGURE 1 of my aforementioned Patent No. 3,231,154), plus an improved keg adapter unit $B_3$ having an enlarged liquid passageway and an improved gas passage and check valve arrangement.

For clarity and to minimize duplication of description, parts of the embodiment of FIGURES 1–5B and 6 which are the same as those in the various embodiments of FIGURES 1–8 of my aforementioned Patent No. 3,231,154 are identified by like numerals as in the drawings and disclosure of said Patent No. 3,231,154 incorporated herein by reference; and modified parts which correspond to parts of various embodiments of FIGURES 1–8 of my aforementioned Patent No. 3,231,154 are identified in FIGURES 1–5B and 6 by like numerals plus the subscript $d$, to the extent that is feasible.

Referring now to FIGURES 1–5B and 6, the improved dispenser coupler unit $A_3$, while somewhat similar to the coupler units shown in FIGURES 2, 3, 5 and 7 of my aforementioned U.S. Patent No. 3,231,154, has a novel, compact, efficient construction which greatly simplifies manufacturing, cleaning and maintenance as compared with commonly used prior art conventional tapping units, and even as compared to my novel advantageous dispenser coupler units exemplified by embodiments $A_1$ and $A_2$ in FIGURES 5–6 and FIGURES 7–7A of my aforementioned U.S. Patent No. 3,231,154.

This improved coupler unit $A_3$ includes a generally cylindrical head 44d which has a central vertically extending bore 136 of three diameters, indicated at 138, 140 and 152. A tubular arm 144, having a central bore 146, is preferably formed integrally with the head 44d and is adapted to receive the end of a piece of tubing that connects coupler unit $A_3$ to a tank of pressurized gas or air, such as the tank 30 shown in FIGURE 1 of my aforementioned U.S. Patent No. 3,231,154. The coupler unit $A_3$ also includes a generally tubular probe 64d which is positioned within the bore 136 and which has a central bore 66d that forms the sole liquid passageway through the coupler unit. The exterior of the probe 64d is provided with grooves 137 and 139 for sealing rings 141 and 143, which may be "O-rings" of neoprene rubber. The sealing rings 141 preclude the escape of gas from passageway defined by bores 146, 136 and 142; and the unique cooperation between head 44d, probe 64d, seals 141 and 143, eliminates the necessity of drilling a separate gas passageway in the head 44d with resultant savings in manufacturing costs and easier cleaning and maintenance.

The upper end of the probe 64d has an outwardly extending flange 148 having an outer diameter and thickness substantially equal to the inner diameter and depth of bore 138 whereby when the probe is positioned within the head 44d, the upper end of the probe 148 is aligned with the top of the head as shown in FIGURE 1. Referring to FIGURE 3A, when dispenser coupler unit $A_3$ is used in a restaurant, a conventional cap 152 is connected to the externally threaded portion 150 of head 44d, and this cap 152, used with a sealing ring 154, holds the probe 64d within bore 136 in coupler head 44d, thereby forcing the lower end of the probe 64d to project sufficiently below the bottom of the coupler head portion 44d so as to open the beer valve in the keg adapter unit $B_3$ when the coupler unit $A_3$ is connected thereto, in a manner similar to that described with regard to the embodiments of FIGURES 2, 5 and 7 of my said U.S. Patent No. 3,231,154 (and as hereinafter amplified). Cap 152 has two handle portions 156 and its upper end 158 is adapted to be connected to the beer conduit of conventional dispensing apparatus typically used in taverns, restaurants, and the like (such as shown at 36, 38, 40 and 42 in FIGURE 1 of said U.S. Patent No. 3,231,154).

An annular member 160 is secured about the slightly enlarged lower end of the coupler head 44d by a snap ring 162 and retains collar 118d rotatably mounted on coupler head 44d. The snap ring 162 allows the member 160 to be quickly removed from the head 44d so that collar 118d can be slipped off head 44d for easy repair or replacement when necessary. The collar 118d has a plurality of handle portions 119d formed integrally therewith, is internally threaded at 124d for cooperation with the threaded portion 128d of the annular ring 126d, as shown in FIGURE 1, and fits loosely on the head thereby permitting relative rotation between the collar and the head. The ring 126c forms the outer portion of the abovementioned improved means (shown particularly in FIGURES 6B, C and D) for securing the keg adapter unit $B_3$ in the standard ¾-inch diameter opening 22 in a conventional beer keg 20, as more fully described hereinafter. The bottom of the head 44d carries an annular seal 56d which may be of an "O-ring" of neoprene rubber, for providing an annular seal between the coupler unit $A_3$ and the upper surface 166 of the ring 126d of adapter unit $B_3$, surrounding the beer and gas passages (see FIGURE 1).

While the keg adapter unit $B_3$ shown in FIGURES 1 and 3 is somewhat similar to the keg adapter units shown in FIGURES 2 and 7 of my said U.S. Patent No. 3,231,154, the keg adapter unit $B_3$ has a unique gas passageway formed therein permitting an enlarged beer withdrawal passage, with an improved beer check valve arrangement providing a number of important advantages, as amplified herein.

Thus, the keg adapter unit $B_3$ comprises a main fitting 76d which includes a generally cylindrical body section 77d having an enlarged flange 78d extending radially outwardly from the upper end thereof. The outer periphery of the flange 78d is notched, as shown at 168, and cooperates with a reversed notched portion 170 formed about the edge of the central aperture 172 in the ring 126d to prevent the fitting 76d from passing upward through the ring aperture 172. These notched portions of the flange 78d and ring 126d are arranged so that when the keg adapter unit $B_3$ is positioned in a keg, the upper surface of the flange 78d lies in the same horizontal plane as the upper surface 160 of ring 126d, as shown in FIGURE 10, whereby metal ring 126d protects the adapter fitting 76d, particularly when the latter is made of plastic.

Figure 5:
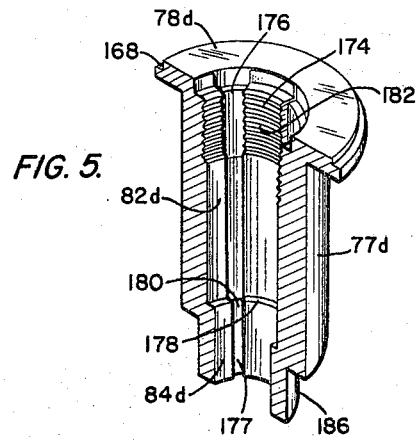
FIGURE 5 is a perspective sectional view of the main portion of the keg adapter unit showing in particular the air passages formed by cutting away threaded portions.
Figure 5B:
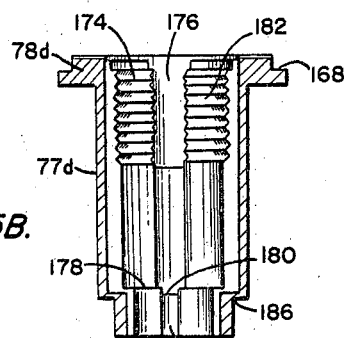
FIGURE 5B is a vertical sectional view of the main portion of the keg adapter unit taken along lines 5B and 5A.
Figure 5A:
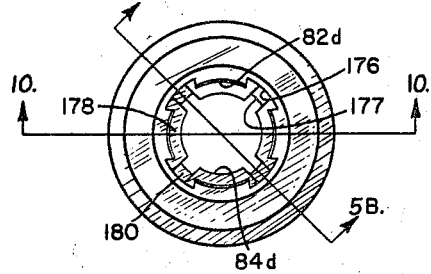
FIGURE 5A is a top plan view of the main portion of the keg adapter unit shown in FIGURES 4 and 5.
Figure 4:
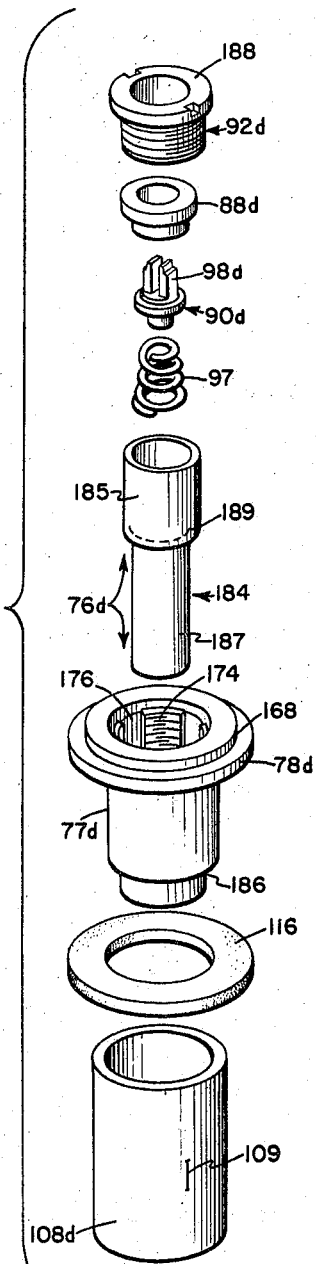
FIGURE 4 is an enlarged perspective exploded view showing the valve and related components of the keg adapter unit.

The body section 77d of main fitting 76d has a pair of centrally disposed, coaxial bores 82d and 84d formed therein. As shown in FIGURES 5A, B and C, there are four longitudinally extending segments 174 positioned evenly about the inner periphery of these two bores and defining between them four substantially identical upper slots or grooves 176 and lower slots or grooves 177. The upper ends of the segments 174 in the lower bore 84d protrude longitudinally, slightly above the shoulder 178 formed between the two bores 82d and 84d thereby forming four radial grooves 180 in the shoulder 178 that interconnect the slots 176 and 177 in the two bores 82d and 84d. The upper portions of the segments 174 in the upper bore 82d are provided with interrupted threads 182 adapted to receive an externally threaded retainer ring 92d, the lower end of which tightly engages annular rubber valve seat 88d to secure valve seat 88d between the ring 92d and the upper end of a tubular member 184. Member 184 includes an upper portion 185 which fits within the bore 82d and a lower portion 187 which fits within the lower bore 84d and extends beyond the lower end of the main fitting 76d. A compression spring 97 fits within the upper portion of the member 184 and its lower end rests on the shoulder 189 formed by the juncture of the two portions 185 and 187 of member 184. The spring 97 biases a new improved form of beer valve 90d upwardly against the underside of the rubber valve seat 88d in a manner like that described above in connection with the embodiments of FIGURES 1–8 of my said U.S. Patent No. 3,231,154. The improved valve 90d differs from valve 90 shown in FIGURE 8 of my said U.S. Patent No. 3,231,154 in that the middle part of the stem portion 98d has been removed as shown in FIGURES 1, 10 and 12, so as to enlarge the beer passage space 99d when the valve 90d is displaced from seat 88 by application of the coupler (as in FIGURE 1). This provides superior beer flow characteristics making the keg adapter unit $B_3$ universal for low- and high-pressure beer systems, while avoiding making the beer "wild" as it is drawn from the keg.

Referring again especially to FIGURE 1, a beer tap rod 106d is frictionally or otherwise secured around the lower end 187 of member 184, and extends to the bottom of the keg (smilarly to FIGURE 1 in my aforesaid U.S. Patent No. 3,231,154). Tap rod 106d may be made of a suitable flexible plastic material, in which case it need not be bent like metal rod 106 in FIGURE 1 of my said Patent No. 3,231,154, to permit insertion of a rod through side opening 29 of typical beer keg 20.

A resilient gas check valve 108d is positioned with a lower portion tightly engaging a peripheral portion of tap rod 106d; and the lower end of the keg adapter fitting body section 77d is chambered at 186 to receive the upper end of the gas check valve 108d which tightly fits around part 186. Like in valve 108 shown in FIGURES 2, 3 and 7, a slit 109 is formed in the intermediate portion of valve 108d to permit gas or air to pass from the inside of the valve to the interior of the keg when the pressure of the gas is greater than the pressure inside the keg; whereas the ends of valve 108d and slit 109 prevent gas or beer from passing from the interior of the keg to the inside of valve 108d and thus preclude contamination of the gas feed portions of the tapping device comprising keg adapter $B_3$ and coupler dispenser $A_3$.

The improved keg adapter unit $B_3$ of this invention including main fitting 76d achieves an increased gas passageway through which gas or air under pressure may pass from dispenser couple unit $A_3$ to the inside of valve 108d, via grooves 176 and 177 and radial grooves 180 formed in the interrupted threads 182 of body section 77d in cooperation with ring 92d, valve seat 88 and member 184. The outwardly extending flange 188 on the upper end of the ring 92d protects the upper end of this passageway from the entry of dirt, etc. without causing undue restriction of the gas passageway. Thus, the improved gas passageway in the adapter unit $B_3$ is formed through the unique utilization of existing structure of the fitting 76d and obviates the necessity of drilling an extra, separate bore for the gas passageway in the adapter unit (as in the embodiments of FIGURES 1–8 of my said Patent No. 3,231,154). This not only leads to savings in the manufacturing costs; but, more importantly, given the maximum limit of a ¾-inch beer keg passage, it makes it possible to provide a larger beer passage in the keg adapter main fitting 76d to reduce pressure drop and enable use in both high-and low-pressure systems. Moreover, use of this feature in conjunction with the beer valve 90d having a cut-out stem 98d in main fitting 76d has provided an unexpectedly improved keg adapter unit $B_3$.

The keg adapter $B_3$ having the described arcuate slotted gas passages extending around the beer valve, as shown particularly in FIGS. 1–5B (and FIGS. 9–13), has a relatively small radial dimension but relatively large annular dimension, thus providing a quite large cross-sectional area within the total overall 3/4 inch diameter size limit imposed on a tapping device for conventional "Peerless" type beer kegs, which are the most numerous in use in the U.S. beer industry. A gas passage arrangement such as shown at 87 in FIGS. 2, 3 and 7 of my aforementioned U.S. Patent No. 3,231,154 is fully satisfactory for a single beer keg installation, which is typical of most U.S. draft beer dispensing installations. However, said gas passage arrangement is not fully suitable for certain types of "Series Taps," wherein a plurality (e.g., four) draft beer kegs are connected in series, according to marketing practices in some parts of the United States. In such "Series Tap" installations, the beer must be driven from the most remote keg in the series through all the intermediate kegs to the first keg connected to the dispensing faucet, via the gas valve passages in the tapping devices. The disclosed and described novel arrangement of arcuate elongated gas passages having a large cross sectional area, with minimal radial dimension makes it possible to use the new improved embodiment of FIGURES 1–5 in series tap draft beer systems. This affords important competitive advantages, since a single model draft beer tapping device according to this invention can be used for both single beer kegs and multiple keg series tap installations. Among other things, this new improvement simplifies production, inventory, marketing, achieving increased trade acceptance, as well as reducing costs, etc.

It is noted, however, that the above described arrangement shown in FIGURES 1–5B, is a preferred form of the improved gas passageway per this invention, but that it would be possible to form grooves like 176 and 177 on the exterior of ring 92d and in member 184 rather than in the interior of body section 77d of the fitting 76d.

As hereinbefore mentioned, th keg adapter unit $B_3$ of FIGURES 1–5 is held in the standard opening 22 in a conventional beer keg 20 by means of a novel and improved securing means shown particularly in FIGURE 6, as well as FIGURES 1–3, adapted to cooperate with the standard so-called "Peerless" beer keg flange or collar 23 found on conventional beer kegs in most common use. This improved securing means includes the ring 126d which, as shown in FIGURE 1, has its lower end spaced slightly above the top the keg 20, and which is internally threaded at 190 to receive an externally threaded ring 192, as shown in FIGURE 6D. The ring 192 includes a thin wall section 194 which has inwardly and upwardly projecting, diametrically opposite tabs 196 and 198 formed on its inner periphery. Also formed on the upper inner periphery of the wall section 194 and spaced circumferentially from the tabs 196 and 198 are inwardly extending, diametrically opposite abutments 200 and 202. As shown more clearly in FIGURE 6E, the standard "Peerless" beer keg flange 23 has two diametrically opposite cut-away portions 204, and at one end of each of these cut-away portions, has a lower depending projection 208 formed integrally with the flange 23 and the short, cylindrical wall 22′ of the opening 22. These two projections 208 have an outer diameter equal to the outer diameter of the flange 23 and the lower end of each is spaced above the top of the keg 20, a distance slightly greater than the height of the wall section 194 of ring 192.

To utilize this improved securing means, the ring 192 is snapped over the flange 23 so that it rests on the top of keg 20 with the tabs 196 and 198 extending upwardly; and the ring 192 is aligned so that the projections 208 of the flange 23 fit between adjacent tabs 196 and 198 and abutments 200 and 202. The keg adapter unit is checked to be sure that main fitting portion 76d is properly positioned within the keg opening 22 and that a sealing ring 116 is correctly positioned between the top of keg flange 23 and the bottom of adapter fitting flange 78d. The ring 126d is then placed over the upper end of the adapter fitting portion 76d and aligned with the flange 78d so that the respective notched portions 168 and 170 of each will properly fit together. Thereafter, the ring 126d is threaded on ring 192 so that the ring 192 is drawn up within the lower inside portion of ring 126d until the upper ends of the tabs 196 and 198 contacts the undersides 23′ of the key flange 23 (FIGURES 1 and 6). The height of the wall section 194 is such that when the ends of the tabs 196 and 198 contact the underside 23′ of keg flange 23, the entire wall section 194 is completely within and protected by the ring 126d. Thus, as shown in FIGURES 1 and 2, when the rings 126d and 192 are assembled, they cooperate with the flange 23 to securely lock the keg adapter unit within the opening 22 to prevent any longitudinal or rotational movement of the adapter unit relative to opening. Moreover, due to the unique construction of this arrangement for securing a keg adapter unit $B_3$ and its main portion 76d in a keg, the relatively complex portion of the securing means, namely, ring 192, may be inexpensively molded of plastic, without sacrificing strength or ruggedness of the keg adapted $B_3$, which encounters considerable abuse in draft beer commercial operations, since the metal ring 126d completely protects plastics securing ring 192 as well as adapter main unit 76d.

Thus, it is readily apparent that the improved securing means of this invention provides a simple and inexpensive, yet sure way of locking the keg adapter units of this invention in the standard 3/4-inch diameter openings of the conventional beer kegs without requiring any modification of the openings or flanges of the kegs.

Summarizing the mode of operation of the unit of FIGURES 1–5, the keg adapter unit $B_3$ is installed in the keg 20 at the brewery as above explained. The beer valve 90d is normally biased closed against seat 88d by spring 97, thus sealing the keg 20, preventing loss of beer or ingress of foreign objects, etc., as discussed above. To tap a keg full of beer, the bartender applied to the adapter unit $B_3$, the coupler unit $A_3$ having a cap 162 connected to a beer outlet conduit, with gas inlet 144 connected to a gas supply. This is done by merely inserting coupler probe 64d in the aperture of ring 92d and rotating coupler collar 118d to thread it on adapter unit collar 126d. The "O-rings" 143, 141 and 56d seal off the gas passage 146–140–142–176–180–177 to the inside of gas check valve 108d. The probe 64d depresses the split valve stem 98d to open the beer dispensing passage through 106d–187–185–88d–66d, while "O-rings" 141 and 143 and slit valve 108d prevent beer from surging into any part of the gas passageways in either the keg adapter $B_3$ or the coupler unit $A_3$. Removal of coupler unit $A_3$ by unthreading collar 118d automatically reseals the keg adapter $B_3$ and thus the keg 20.

Referring especially now to FIGURES 7 and 8, there is shown another embodiment of keg adapter unit $B_4$ which is similar to the adapter unit $B_3$ shown in FIGURES 1–5. For clarity, and to avoid duplicate description, parts of the embodiment of FIGURES 7 and 8 which are like those in the embodiment of FIGURES 1–6 (and in some instances in FIGURES 1–8 of my aforementioned U.S. Patent No. 3,231,154) are identified with like numerals; whereas modified corresponding parts are identified with like numerals plus the subscript e to the extent feasible.

The principal differences of adapter unit $B_4$ from unit $B_3$ is that adapter unit $B_4$ includes a modified main fitting 76e with a modified gas passageway plus a modified resilient gas check valve utilized therein to prevent liquid from entering the gas passageway and also acting as the sealing member between the keg flange 23 and flange 78e of the keg adapter unit B₄.

In this embodiment, the keg adapter main fitting 76e includes member 77e which comprises enlarged upper section 209 and smaller lower section 211 having internal bores 82e, 84e and 80e, with part of the latter threaded, as shown in FIGURES 7 and 8. Main fitting 76e includes a beer valve 90d sealingly biased against sealing ring 88d by spring 97, held within bores 82e, and 80e by means of threaded ring 92e which cooperates with the threaded portion of bore 80e, as will be apparent from FIGURES 7 and 8 and description of comparable components in previously discussed embodiments.

The modified gas passageway consists simply of a pair of bores 212 drilled through the flange 78e, with the upper end of each bore 212 positioned adjacent the root of the threads formed in bore 80e and the lower end of each bore 212 positioned adjacent the peripheral outer surface of cylindrical section 209 of body member 77e. A resilient gas check valve 214, similar to valve 108d, is positioned about section 209 of body 77e so that its upper cylindrical portion is adjacent the lower end of the bore 212; and, as shown in FIGURE 7, the gas check valve 214 includes a lateral portion 213 which underlies the flange 78e of body member 77e, thereby providing a seal between the keg flange 23 and the adapter unit 76e. As in previously described embodiments, the lower end of the resilient gas check valve 214 sealingly engages the exterior of tap tube or rod 106e secured to portion 211 of body member 77e. The intermediate portion of the valve 214 has one or more slits 216 therein which permits the gas passing through the bores 212 into the interior of valve 214 to pass into the keg whenever the pressure on the inside of the valve is greater than the pressure in the keg. Also, as shown in FIGURE 7, it should be noted that unlike the adapter B₃, shown in FIGURE 1, the body 77e and member 211 are made as a single unit. Otherwise the keg adapters B₃ and B₄ are similar.

The adapter unit B₄ has a simple construction, especially of the gas passageways, and the resilient valve 214 also serves as the sealing member between the keg flanges 23 and adapter flange 78e. Adapter unit B₄ can be made and used with conventional kegs having a ¾-inch opening. The adapter B₄ can be used with a dispenser coupler such as A₃ of FIGURES 1–2 (or A₁ or A₂ of FIGURES 5 and 7 of my aforesaid U.S. Patent No. 3,231,154), as will be apparent from the disclosure herein.

Referring now to FIGURES 9–13, there is shown an improved picnic dispenser coupler unit A₄ of this invention which permits beer to be conveniently drawn from beer kegs without the mess and wastage heretofore commonly encountered when kegs were tapped at picnics, outings, and the like. This picnic dispenser coupler unit can be used without either a tank of compressed gas or a conventional dispensing apparatus (such as shown at 30 and 40, respectively, in FIGURE 1), since the means for dispensing the bear into glasses, mugs, etc. and for pressurizing the keg are associated with the coupler unit A₄.

Once again for clarity and to minimize duplication of description, parts of the embodiments of FIGURES 9–14 which are the same as those in the embodiments of FIGURES 1–8 of my aforementioned Patent No. 3,231,154 or of FIGURES 1–8 herein are identified by like numerals, and modified parts are identified by like numerals plus the letter f, to the extent practicable.

Also, in the picnic keg tapping device of FIGURES 9–13, the keg adapter unit is indicated at B₃ in keg 20 (smaller picnic size, but otherwise a conventional keg); and adapter unit B₃ is identical with adapter unit B₃ of FIGURES 1–6, whereby the adapter unit B₃ per se will not be described in any detail in connection with FIGURES 9–13.

Referring now to FIGURE 9, a conventional, manually operated air pump 218 is shown connected, via tubing 220, to the improved picnic dispenser coupler unit A₄. The coupler unit A₄ is connected to the keg adapter unit B₃ of this invention by threading of collar 118d of the coupler dispenser A₄ on the collar 126d of adapter unit B₃ in the same manner as coupler A₃ is mounted on adapter unit B₃ in the embodiment of FIGURES 1–6.

The improved picnic dispenser coupler unit A₄ is somewhat similar to the coupler unit A₃ shown in FIGURES 1–3. However, one major functional difference between the improved picnic coupler unit A₄ and the other coupler units disclosed herein (A₃, A₂ and A₁) resides in the fact that, as shown in FIGURE 10, when the picnic coupler unit A₄ is connected to a keg adapter unit, the lower end of the probe 64d does not automatically and continuously hold open the beer valve 90d in the keg adapter unit; instead the beer valve 90d normally remains in sealing engagement with seating ring 88d under the action of spring 97.

Referring now to FIGURES 10, 12 and 13 (the cross-section of adapter unit in FIGS. 10–12 is along the lines 10—10 in FIG. 5A), the probe 64f, like probe 64d, is positioned within the bore 136 formed in the head 44d and is provided with external grooves in which are mounted O-ring seals 141 and 143, positioned so as to seal off the gas passageway and separate from it the liquid passageway when the dispenser coupler unit A₄ is assembled with the adapter unit B₃. The probe 64f also has a central liquid passageway 66f extending therethrough. The upper end of the probe 66f receives the lower end of a plastic tube 222 which extends substantially coaxially through a curved, inverted J-shaped metal tube 226 through which beer is dispensed from a beer keg into glasses, mugs, etc., whereby tube 222 provides a continuing liquid passageway for beer flowing through the bore 66f when beer valve 90d is opened. An annular member 228 surrounds the lower end of the tube 222 and the upper end of the probe 64f; and, like the lower end of the tube 222, it abuts the shoulder 230 formed on the probe 66f. The upper end of the member 228 has an outwardly extending flange 232 formed thereon which engages the bottom of flange 234 formed on the lower end of tube 226.

A collar 235 is threaded on the upper end of the head 44d and has a central aperture 236 therein. The size of the aperture 236 is such that the tube 226 may easily and freely slide therethrough, while the flange 234 abuts the inturned edge 237 of collar 235 surrounding aperture 236. Thus, because of the engagement between the flange 234 and collar edge 237, the lower ends of the tubes 222, 226, member 228, and probe 64f are retained within the bore 136 against the bias of a compression spring 238 which surrounds the probe 64f and which is positioned between the shoulder 230 on probe 64f and the shoulder formed between the different diameter portions 140 and 142 of bore 136. As shown in FIGURE 12, and as amplified hereinafter, pressing down on the metal J-tube 226 causes tubes 222 and 226, member 228 and the probe 64f to move downward against the bias of the spring 238. When this downward pressure is released, the spring 238 quickly returns these members to the position shown in FIGURE 10.

The operation of the picnic tapping assembly shown in FIGURES 9–13 utilizing picnic dispenser coupler unit A₄ is as follows: The coupler Unit A₄ is placed on the ring 126c so that the lower end of the probe 64f (with O-ring 143) is introduced into the central bore of the ring 92c. The collar 118d is threaded onto the ring 126d until the coupler unit A₄ assumes the position shown in FIGURE 10 with respect to adapter unit B₃. Thus, as noted above, the probe 64f does not open the beer valve 90d when these units are merely assembled. To open the valve 90d to tap the keg and dispense beer therefrom, the metal J-tube 226 must be pressed down against the bias of spring 238 so that the tube 226 assumes the dotted line position shown in FIGURE 9. This downward movement of the tube 226 causes the probe 64*f* also to move downward so that its lower end displaces the valve stem 98*d* downward and opens the beer valve 90*d* against the bias of spring 97, as shown in FIGURE 12. Under pressure, beer from the keg 20 then flows up through the tap rod 106*d*, member 184, past beer valve 90*d* and through valve seat 88*d* into and through bore 66*f* in the probe 64*f* and thence discharged through tube 222. To stop the flow of beer, the tube 226 is simply released and allowed to return again to the solid line position shown in FIGURE 9, under action of spring 238, thereby again closing the beer valve 90*d* by spring 97. Of course, the rate of flow of the beer from the keg may be varied by varying the distance the tube 226 is moved downward. When it is desired to pressurize the beer in the keg, the pump 218 is actuated so that air under pressure flows through the tubing 220 and bores 146, 140 and 142 of coupler A₄, and then through the gas passageway in adapted unit fitting (76*d* of adapter B₃), and out through the slit 109 in valve 108*d* into the keg 20. Sealing rings 141, 143 and 56*d* insure that the gas passageway is sealed, and that the beer passageway in the tapping devices remains completely segregated from the gas passage, so that complete freedom from contamination of the gas passageway is insured. To assure that the gas or air cannot escape from the tapping device comprising units A₄ and B₃, a conventional one-way check valve can be added in air input section 144 of coupler unit A₄, or in conduit 220, if pump 218 does not include such a means.

Referring now to FIGURE 14, there is shown an embodiment in which an improved keg adapter unit of this invention is installed in the top keg opening of a so-called "Golden Gate" type of beer keg, which is the major commercial alternative to conventional beer kegs discussed above, and was designed to overcome shortcomings of prior tapping systems for conventional beer kegs. In the "Golden Gate" system, beer is withdrawn through an enlarged opening formed in the bottom side wall of the keg; while pressurized gas or air is introduced into the keg through a 1½ inch opening in the top of the keg. In other words, the "Golden Gate" system requires supply and application of two separate fittings for two different keg openings—one for introduction of air into the keg and another for the withdrawal of the beer. In addition, the "Golden Gate" system requires tilting of the keg for maximum dispensing of beer through the bottom side beer opening. This requires a larger beer cabinet and makes handling more difficult (aside from the problem of two different gas and beer fittings).

In spite of such disadvantages of having to use two completely different sets of keg fittings and dispensary couplers, etc., the "Golden Gate" system has been adopted and used by some of the largest U.S. breweries prior to the present invention, to obviate some of the above-mentioned serious problems encountered with the long-prevailing, conventional beer kegs and tapping systems.

Heretofore, when breweries using kegs according to the "Golden Gate" system recognized the above-described advantages of the new improved tapping device of this invention, they were reluctant to abandon their substantial capital investment in the "Golden Gate" kegs, hindering commercialization of the present invention in this segment of the total draft beer market. However, by the use of the novel arrangement of FIGURE 14, any of the keg adapter units of this invention can be easily installed in "Golden Gate" kegs so that breweries committed to the "Golden Gate" type of kegs can modify them and provide their customers with the numerous aforementioned advantages of the tapping device of this invention. In fact, the arrangement shown in FIGURE 14 eliminates shortcomings of the "Golden Gate" system such as the necessity of supplying and applying two fittings to introduce air or gas and withdraw beer, and also eliminates the present need for cumbersomely tilting the "Golden Gate" type kegs for maximum beer withdrawal, thus permitting the tavern or restaurant to use standard size refrigerating equipment to cool the kegs.

For clarity and to minimize duplication of description, parts of the embodiment of FIGURE 14 which are the same as those in the embodiments of FIGURES 1-8 of my aforementioned Patent No. 3,231,154 or of FIGURES 1-13 herein are identified by like numerals, and modified parts are identified by like numerals plus the letter *g*, to the extent practicable.

Referring now to FIGURE 14, a standard "Golden Gate" beer keg indicated at 20*g* has an enlarged annular opening 22*g* in the top wall thereof. The opening 22*g* is surrounded by the member 240 which has a 1½ inch inside diameter portion 242, a larger internally threaded portion 244, and a shoulder portion 246 spaced therebetween. A 1½ inch internal diameter annular sealing ring 248 is seated on the shoulder 246 of the keg opening and is held in place by the lower flange 250 of a bell-shaped member 252. When assembled as shown in FIGURE 14, the flange 250 bears tightly against the ring 248 thereby forming a liquid and gas seal therebetween. A central opening 254 is formed in the upper end of the member 252 and is of such a size that the body section 77*d* of the fitting 76*d* of the adapter unit B₃ is able to pass freely therethrough while the lower side of the flange 78*d* engages the edges thereof. A sealing ring 256 is positioned between the underside of flange 78*d* and the member 252 to form a liquid and gas seal therebetween. A ring 126*g* is then aligned with the fitting 76*d* so that the notched portion 168 of the flange 78*d* mates with the notched portion 170 formed about the central opening 172 of ring 126*g* in the manner described above in connection with ring 126*d*. The ring 126*g* is identical to ring 126*d* shown in FIGURE 6B except that it also has an externally threaded portion 258 formed on its lower, outer periphery. This threaded portion engages the internal threaded portion 244 of the keg member 240 so as to securely hold the ring within the opening 22*d*. When the ring 126*g* is tightly threaded into the opening 22*d*, it causes the flange 78*d* to bear against the upper end of the member 252 so as to support the keg adapter unit B₃ rigidly within the keg.

The siphon or tapping tube 106*d* extends to the bottom of the keg; and the bottom side opening of the "Golden Gate" keg is merely sealed with a plug, disc, or other suitable means.

Thus, it is apparent that through the use of this relatively simple but unique arrangement, any of the improved keg adapter units (B₃, B₂ or B₁) of this invention can be installed in a "Golden Gate" type of beer keg, thereby permitting the universal usage of the tapping device inventions described herein and making these inventions available to a segment of the brewery industry which would otherwise be denied their advantages.

It should be noted that various of the dispenser coupler units herein disclosed and described can be used interchangeably with various of the keg adapter units disclosed and described. Furthermore, the term "siphon" is occasionally used herein to describe tapping devices, such as the tapping device of this invention, for kegs and like containers, although the term is technically a misnomer in that such tapping devices do not utilize a siphon or the siphon principle in any way. When the term "siphon" is used herein, it is therefore to be understood that it refers to a tapping device of the type disclosed and claimed herein.

In recapitulation, it is apparent from the foregoing that the present invention provides a new improved gas pressure tapping device for drawing fluids such as beer from containers such as beer kegs; said tapping device utilizing a new improved keg adaper unit which remains in the beer keg at all times keeping it sealed and a new improved dispenser coupler unit which is semi-permanently connected to the conventional dispensing apparatus at a tavern or restaurant and which can be readily and easily connected to the keg adapter unit by a bartender. While keeping within the ¾ inch outer diameter limitation dictated by the size of beer openings in conventional beer kegs, the improved keg adapter unit of this invention have a relatively large, nontortuous and unobstructed liquid passage through which the beer is withdrawn from the keg with a minimum of expansion and contraction, thereby substantially obviating the problem of beer becoming "wild" or "flat" during withdrawal, and making this invention universally usable with low and high pressure beer systems. Moreover, the improved keg adapter units of this invention also include a gas passage which is completely segregated from the liquid passage therein, and with the beer being positively prevented from entering any part of the gas passage from within the keg, thus preventing contamination of the beer. In addition, the keg adapter units include new improved means for securing said adapter units within the beer openings in conventional beer kegs (e.g. so-called "Peerless" system kegs) and also within the enlarged openings in the "Golden Gate" type kegs, without modification of openings in these beer kegs. The new improved coupler units of this invention can be easily and quickly attached to the keg adapter units and permit the tapping of beer kegs without the mess and economic loss heretofore common in tapping beer kegs using the prior tapping devices. The arrangement of the dispenser coupler unit of this invention is such that it can be easily maintained and cleaned and can be manufactured competitively. Thus, the new, improved tapping device of this invention, with all its herein disclosed novel and improved features, clearly achieves the various important objects and advantages set forth above.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A liquid dispensing apparatus adapted for use with a keg or like container for liquids which has a top, bottom and side walls with an opening in one wall of said keg characterized in that it comprises: a keg adapter comprising a main body adapted to be secured within the keg wall opening and having a liquid passage extending through said body in the direction of the longitudinal axis of said body for transfer of liquid from the inside to the outside of a keg; normally closed liquid valve means in said liquid passage, with means for retaining said liquid valve means within said body; at least one gas passage bypassing said liquid passage and liquid valve means for transmitting gas through said keg adapter from the outside to the inside of a keg, at least a portion of said gas passage including in said adapter a slot which extends circumferentially around the longitudinal axis of said liquid valve means, with the dimension of said slot which extends circumferentially around said axis being sufficiently larger than the dimension thereof radially of said axis to provide a gas passage slot on enlarged cross-sectional area but radially small dimension; and gas valve means on said adapter associated with said gas passage for permitting the flow of gas toward the inside of a keg and preventing flow of liquid from a keg into said gas passage.

2. A liquid dispensing apparatus as defined in claim 1, wherein said liquid valve retaining means comprises an annular member, with part of said main body and said annular member having mating threaded sections securing said annular member in said main body; each said gas passage slot portion being formed by longitudinal interruption of a segment of at least one of said mating threaded sections securing said annular member in said main body.

3. A liquid dispensing apparatus as defined in claim 1, wherein said liquid valve means includes a valve seat having an opening therethrough, a valve plate having a bifurcated stem extending from one side thereof, and means normally biasing said valve plate against said seat, with said bifurcated stem extending through said opening in said seat.

4. A liquid dispensing apparatus as defined in claim 2, comprising: siphon tube means connected with said liquid passage on the side of said liquid valve means opposite said annular member; with a plurality of said gas passages extending around said liquid valve, each including a plurality of arcuate slot portions between said annular member and said main body, said gas valve means comprising a slit cylindrical valve of flexible material having one portion thereof sealingly engaging part of said siphon tube means and another portion thereof surrounding and sealing off the ends of said gas passages extending from part of said main body adapted to be disposed inside a keg.

5. A liquid dispensing apparatus as defined in claim 4, wherein said liquid valve means includes: a valve seat having an opening therethrough, a valve plate having a bifurcated stem extending from one side thereof, and means normally biasing said plate against said seat, with said bifurcated stem extending through said opening in said seat.

6. A liquid dispensing apparatus as described in claim 5, further comprising means for securing said keg adapter unit within said keg opening, said means including: a first externally threaded annular member having means for non-rotatably positioning it around said keg neck between said keg flange and said keg wall; and an internally threaded second annular member threadedly engageable with said first annular member so as to overlie it and also part of said main body of the adapter unit and said keg flange.

7. Apparatus according to claim 1 wherein said gas valve means comprises a tubular resilient gas check valve mounted on said adapter adjacent its lower end.

8. Apparatus according to claim 7 wherein the upper end of said gas check valve communicates with said gas passage through said adapter, a portion of said gas check valve being expandable under pressure to permit gas to flow under pressure through said adapter into said keg while inhibiting gas flow in the opposite direction.

9. Apparatus according to claim 1 including siphon tube means connected to the lower end of said adapter and communicating with said liquid passage through said adapter.

10. Apparatus according to claim 1 including a plurality of said gas passages, each including a slot in said adapter which extends circumferentially around the longitudinal axis of said liquid valve means.

11. Apparatus according to claim 1 wherein said liquid valve means includes a valve seat having an opening therethrough, a valve plate, and spring means normally biasing said plate upwardly against said seat to close said liquid valve means.

12. A liquid dispensing apparatus adapted for use with a keg or like container for liquids which has a top, bottom and side walls with an opening in one wall of said keg, characterized in that it comprises a keg adapter unit including: a main body adapted to be secured within the keg wall opening and having a liquid passage extending through said body to permit transfer of liquid from the inside to the outside of a keg; normally closed liquid valve means in said liquid passage, including a seat having an opening therethrough, and a valve member having a bifurcated stem extending through said opening in said seat; with means normally biasing part of said valve member into sealing engagement with said seat; at least one passage in said main body for transmission of gas from the outside to the inside of a keg, bypassing said liquid valve; siphon tube means connected with said liquid passage; and slit annular gas valve means having a portion thereof surrounding part of said main body adapted to be disposed within a keg and another portion thereof extending around said siphon tube means, said valve means permitting flow of gas toward the inside of the keg and preventing flow of liquid from the keg into said gas passage.

13. A tapping device or siphon for a keg or like container for liquids such as beer which has a top, bottom and side walls with an opening in one wall of said keg, characterized in that it comprises: a keg adapter unit including a main body adapted to be secured within a keg opening, with a liquid passage extending through said main body to permit transfer of liquid from the inside to the outside of a keg; normally closed liquid valve means in said liquid passage, including a seat having an opening therethrough, and a valve member having a bifurcated stem extending through said opening in said seat, with means normally biasing part of said valve member into sealing engagement with said seat; at least one gas passage in said main body for transmission of gas from the outside to the inside of a keg, bypassing said liquid valve means; gas valve means associated with part of said gas passage in a portion of said main body disposed within a keg for permitting flow of gas toward the inside of the keg and preventing flow of liquid from the keg into said gas passage; means for securing said main adapter body in said opening of a keg with a seal therebetween; a coupler and dispensing unit including a head member having a probe extending therefrom, with a liquid passage extending through said probe and coupler head; a gas passage in said coupler head bypassing said liquid passage in the coupler head; means for securing said coupler and dispensing unit to said adapter unit with said probe extending into a portion of said liquid passage in said keg adapter unit and depressing said bifurcated stem of the liquid valve member, thus opening said normally closed liquid valve means and permitting liquid to pass from the keg side of said liquid passage in the adapter unit through said liquid valve means and said liquid passage in said probe and coupler head; sealing means between a portion of said probe and a portion of said keg adapter unit, and additional sealing means between saaid coupler head and another portion of said keg adapter unit, the adjacent ends of said gas passage in said keg adapter unit and said coupler head member being disposed between said sealing means, so that gas will pass from the gas passage in said head member through the gas passage in said keg adapter unit to said gas valve means of the adapter unit, with the the gas and liquid passages of the tapping device assembly being isolated from each other.

14. A liquid storing and dispensing apparatus for beer or the like comprising: a keg having a top, bottom and side walls with an opening in at least one wall; a keg adapter unit, and means for sealingly securing said adapter unit in said keg opening; said keg adapter unit having a main body with a liquid passage extending through said body from the outside to the inside of said keg; normally closed liquid valve means in said liquid passage, including a seat having an opening therethrough, and a valve member having a plate portion with a bifurcated stem extending from said plate portion through said opening in said seat, with means normally biasing said plate portion of the valve member into sealing engagement with said seat; at least one passage in said main body of the adapter unit bypassing said liquid valve means, for transmission of gas from the outside to the inside of said keg; a tap rod associated with said liquid passage of the adapter unit and extending from said adapter unit to adjacent the bottom of said keg; and annular gas valve means of resilient material disposed within the keg having a portion thereof extending around part of said main body and another portion thereof extending around said siphon tube means, said resilient valve means including at least one slit portion permitting flow of gas toward the inside of the keg and preventing flow of liquid from the keg into said gas passage.

15. A liquid storing and dispensing apparatus as defined in claim 14, wherein said liquid valve means is retained by a ring member, with mating threaded sections on said ring member and said main body; said gas passage including a portion formed by a longitudinal segment extending through at least one of said threaded sections between said ring member and main body.

16. A liquid dispensing apparatus adapted for use with a keg or like container for liquid. which has a top, bottom and side walls with an opening in one wall of said keg characterized in that is comprises: a keg adapter unit including a main body and an outwardly extending flange portion, said unit being adapted to be secured within the keg wall opening; a liquid passage extending through said main body for transfer of liquid from the inside to the outside of a keg; normally closed liquid valve means in said liquid passage; at least one gas passage in said adapter unit bypassing said liquid passage and liquid valve means, for transmitting gas from the outside to the inside of a keg; siphon tube means connected with said liquid passage on one side of said liquid valve means; gas valve means associated with said gas passage including an annular portion of resilient material surrounding part of said main body adapted to be disposed within a keg opening with another portion thereof extending around said siphon tube means, said annular resilient gas valve portion having at least one slit therein permitting the flow of gas toward the inside of the keg and preventing flow of liquid from the keg into said gas passage, said gas valve means also including an outwardly extending flange portion underlying said flange portion of the adapter unit for forming a seal between said adapter unit and a keg.

17. An apparatus as defined in claim 16, wherein said gas passage comprises at least one aperture extending through a portion of said keg adapter unit flange in the region where it joins said main body of the adapter unit, with said aperture being in communication with the interior of said annular gas valve portion and said flange portion of the gas valve extending outwardly of said region of said aperture.

18. The apparatus as defined in claim 14 and further including a liquid dispensing coupler unit connected to said keg adapter unit, said liquid dispensing coupler unit comprising: a head member having means for opening said normally closed liquid valve in said keg adapter unit when said dispensing coupler unit is assembled with said keg adapter unit; liquid passage means in said coupler head communicating with the outlet of said liquid passage means in said keg adapter unit to permit the flow of liquid from said keg through said coupler head; gas passage means in said head and sealing means between said keg adapter unit and said dispensing coupler unit whereby one end of said gas passage means in said coupler head is in communication with said gas passage means in said adapter unit, bypassing said liquid passage means in said keg adapter unit and said dispensing coupler.

19. The apparatus as defined in claim 18 wherein said head member has a bore therein; a probe disposed in said bore and having one end projecting from said head member whereby when said keg adapter unit and said coupler unit are assembled together, said end of said probe opens said liquid valve in said adapter unit; said liquid passage means in said coupler unit being formed in said probe; dispensing means communicating with the other end of said probe and said gas passage means in said coupler unit includes a portion of said space between said probe and said bore and has the other end adapted to be connected with a source of gas under pressure.

20. A liquid dispensing apparatus for a conventional beer keg having a top, bottom, and side walls within an opening in at least one wall surrounded by a keg neck having a flange extending outwardly from said keg neck, with at least one lug extending radially outward of said keg neck below said flange, comprising: a keg adapter having a main body with an outwardly extending flange; a liquid passage in said main body for transfer of liquid from the inside to the outside of said keg; normally closed liquid valve means in said liquid passage; a gas passage in said keg adapter bypassing said liquid passage and liquid valve means, for transmission of gas from the outside to the inside of said keg; gas valve means in communication with said gas passage and adapted to be disposed within the beer keg interior for permitting the flow of gas toward the inside of the keg and preventing the flow of liquid from the keg into said gas passage means; means for securing said keg adapter within the keg opening, said means including a first externally threaded ring member having means for cooperating with said lug extending radially from said keg neck to non-rotatable position, said first ring member between said keg flange and said keg well, and a second ring member having an internally threaded portion adapted to threadedly engage said first ring member with said second ring member overlying said adapter flange and said keg flange to clamp said adapter flange between said second ring member and said keg flange when said second ring member is threaded onto said first ring member, said keg neck having a pair of lugs extending radially therefrom below said keg flange, wherein said first ring member has two sets of circumferentially spaced tabs which cooperate with said lugs to prevent rotational movement of said securing means when said first and said second ring members are threadedly engaged, said first ring member also having a pair of circumferentially spaced lugs extending therefrom in axial direction and engageable with parts of said keg flange.

References Cited

UNITED STATES PATENTS

| | | | |
|---|---|---|---|
| 2,123,755 | 7/1938 | Tear et al. | 222—400.7 X |
| 2,223,012 | 11/1940 | Wanderski et al. | 222—507 X |
| 2,749,930 | 6/1956 | Whitnall | 137—212 |
| 3,065,885 | 11/1962 | Chatten | 222—400.7 |
| 3,173,586 | 3/1965 | Pawson | 222—400.7 |
| 3,231,154 | 2/1966 | Johnston | 222—400.7 |

ROBERT B. REEVES, *Primary Examiner.*

N. L. STACK, *Assistant Examiner.*

U.S. Cl. X.R.

137—212; 222—464